(12) United States Patent
Kroeger et al.

(10) Patent No.: US 11,899,114 B1
(45) Date of Patent: Feb. 13, 2024

(54) SECONDARY SENSOR DATA-BASED SOFT CONSTRAINT OPTIMIZATION FOR POSE GRAPH AND MAPPING REFINEMENT

(71) Applicant: Zoox, Inc., Foster City, CA (US)

(72) Inventors: Till Kroeger, Chicago, IL (US);
Veeresh Taranalli, San Jose, CA (US);
Michael Carsten Bosse, Templeton, CA (US)

(73) Assignee: ZOOX, INC., Foster City, CA (US)

( * ) Notice: Subject to any disclaimer, the term of this patent is extended or adjusted under 35 U.S.C. 154(b) by 67 days.

(21) Appl. No.: 17/829,348

(22) Filed: May 31, 2022

(51) Int. Cl.
*G01S 17/89* (2020.01)
*G01S 17/931* (2020.01)
*G01S 17/875* (2020.01)

(52) U.S. Cl.
CPC ............ *G01S 17/89* (2013.01); *G01S 17/875* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 11,002,859 B1* | 5/2021 | Zhang | ................ | G06V 10/7715 |
| 11,049,267 B2* | 6/2021 | Selviah | ................ | G06T 7/33 |
| 11,131,752 B2* | 9/2021 | Yang | ................ | G01S 17/89 |
| 11,465,642 B2* | 10/2022 | Xiao | ................ | G01S 17/89 |
| 11,726,208 B2* | 8/2023 | Wang | ................ | G01S 17/10 |
| | | | | 356/4.01 |

* cited by examiner

Primary Examiner — Todd Melton
(74) Attorney, Agent, or Firm — Lee & Hayes P.C.

(57) ABSTRACT

A soft-constraint technique for refining an initial pose graph may eschew using a hard constraint that identifies different sensor data and/or poses as necessarily being associated with a same portion of an environment. Instead, the soft-constraint technique may employ a loss function with a convergence basin that may be defined based at least in part on an object classification that strongly penalizes candidate locations within a distance associated with the convergence basin. These candidate locations may be based at least in part on one or more object detections associated (1:1) with one or more poses of the initial pose graph. This may result in one or more candidate locations that do not merge with other candidate locations, giving the pose graph optimization the permissiveness or softness according to the techniques described herein.

20 Claims, 5 Drawing Sheets

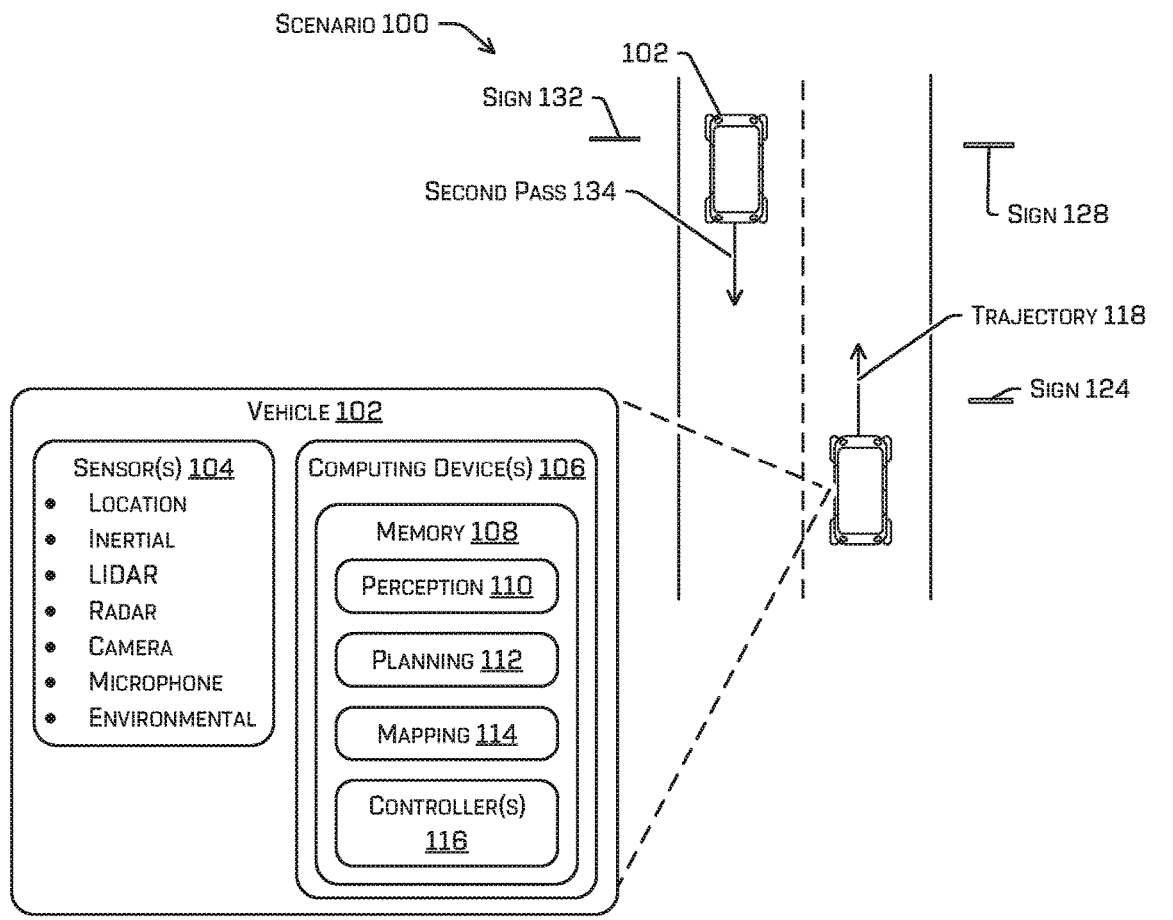
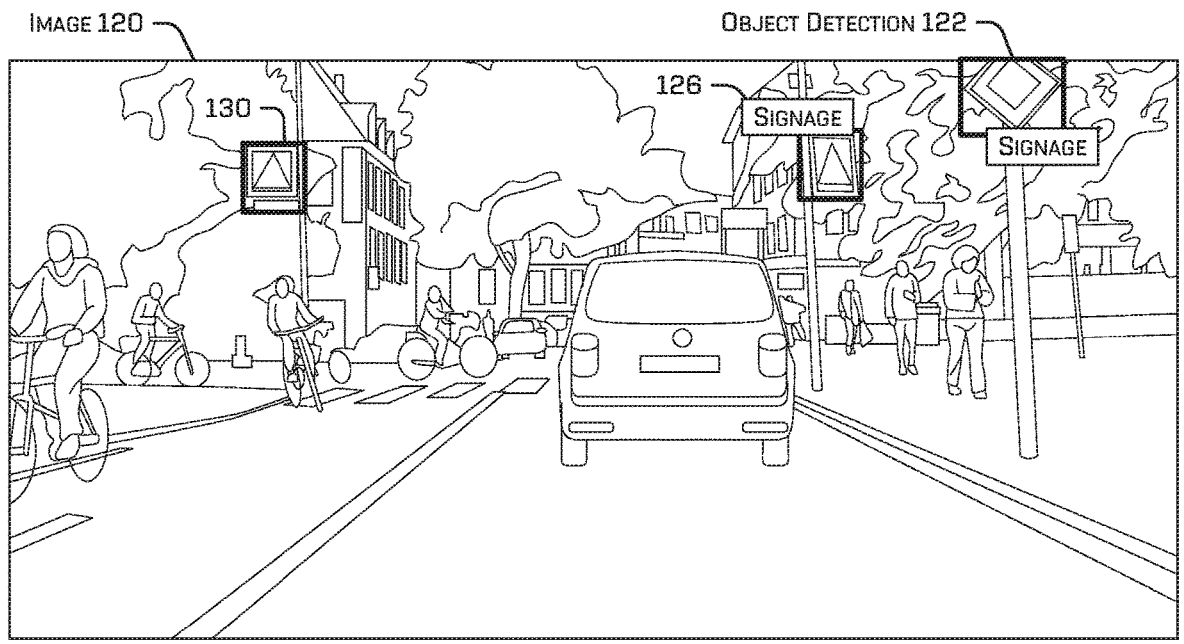
FIG. 1

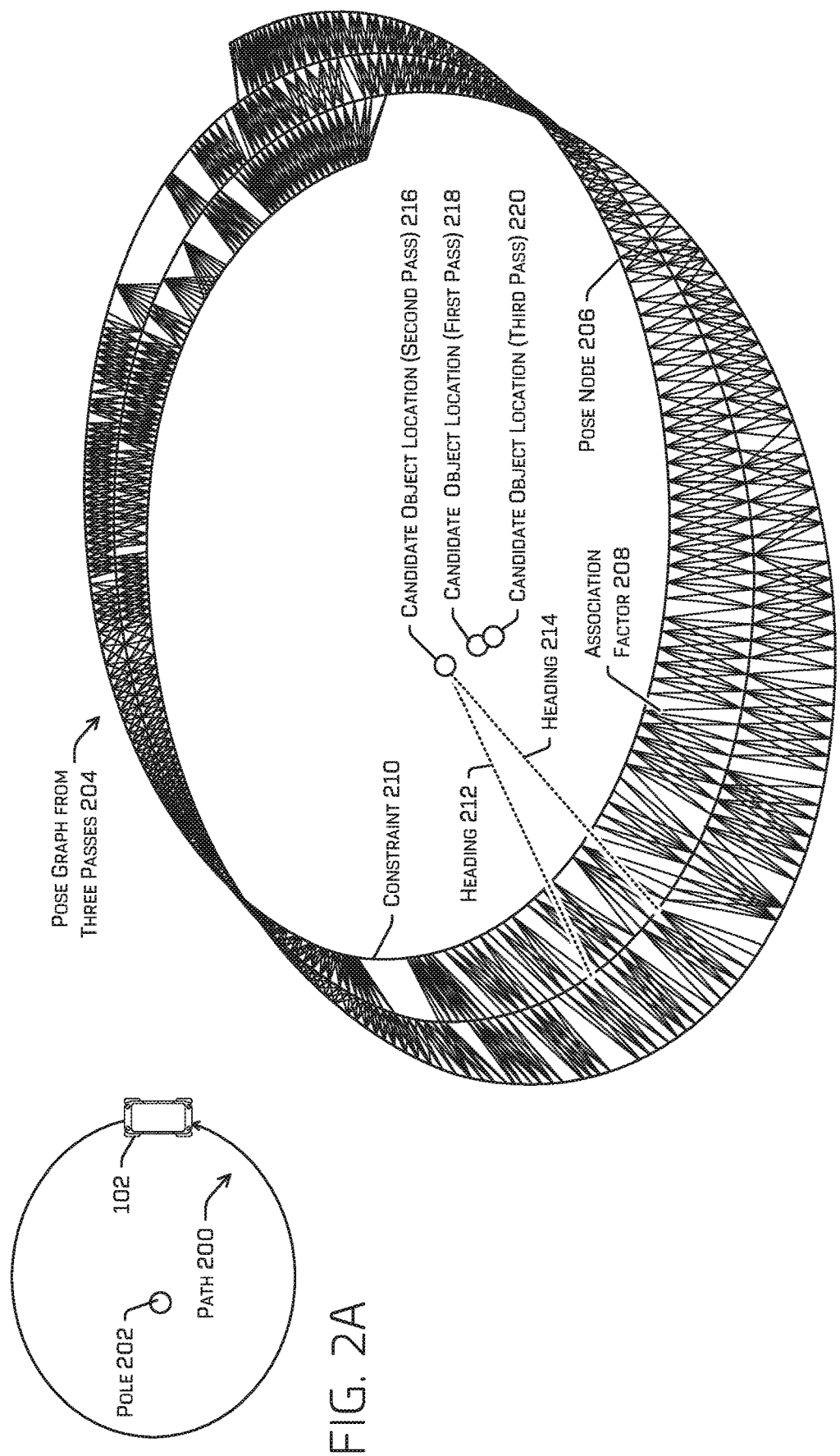

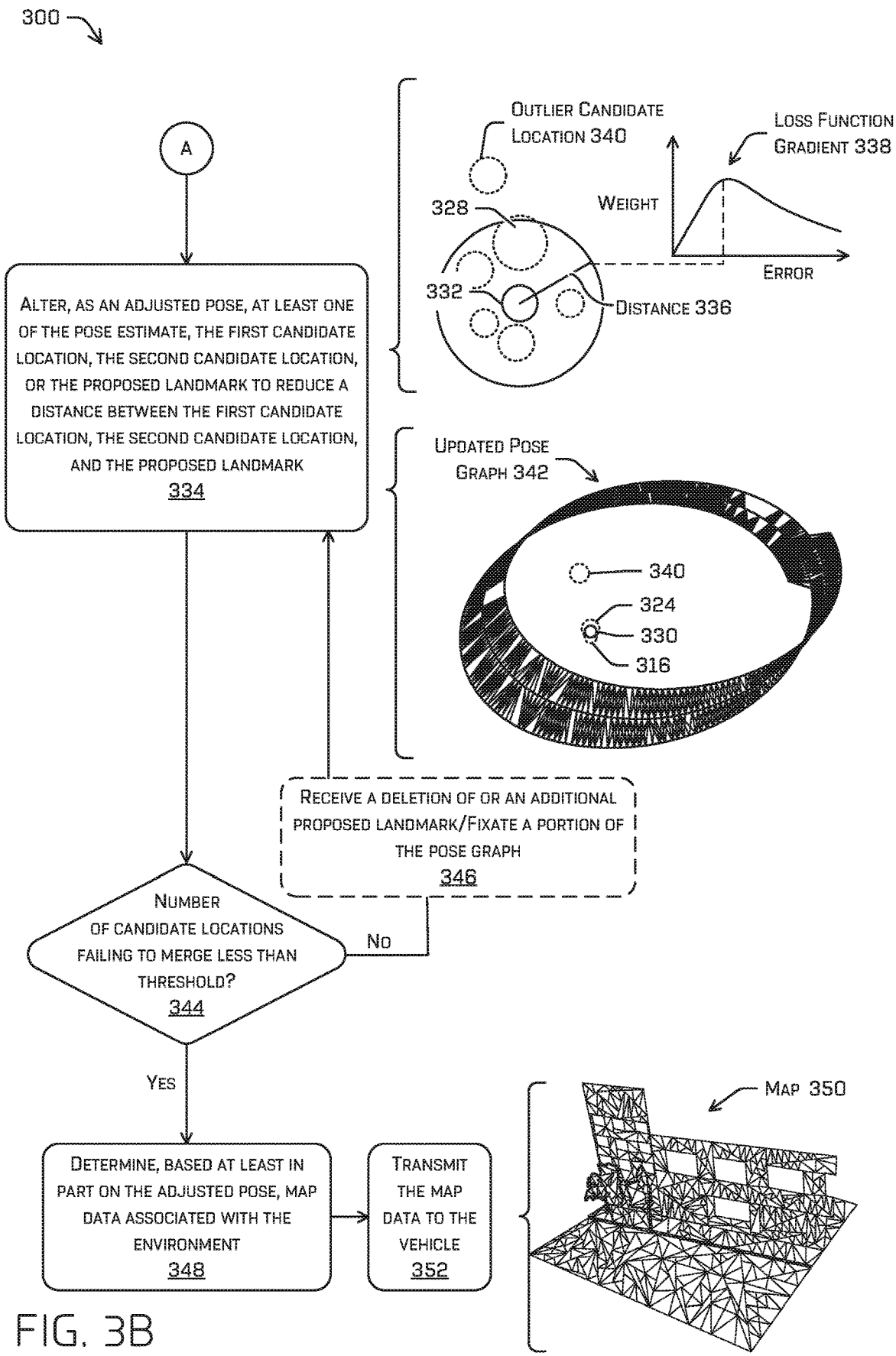

SECONDARY SENSOR DATA-BASED SOFT CONSTRAINT OPTIMIZATION FOR POSE GRAPH AND MAPPING REFINEMENT

BACKGROUND

An autonomous vehicle can navigate in an environment at least partially based on a map of the environment. Such an autonomous vehicle may comprise sensors, such as lidar sensors, which can be used to obtain data representative of the environment, with the data then used in a mapping process to generate a map or update an existing map. However, errors in the map or mapping process can create unsafe situations for those systems which rely on accurate maps, such as in the case with autonomous vehicles, as an example.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 1 illustrates an example scenario in which an autonomous vehicle may receive sensor data associated with an environment that may be used to generate a map of the environment.

FIG. 2A illustrates an example path an autonomous vehicle may take multiple times (multiple passes of a same location), for the sake of a simple example.

FIG. 2B illustrates a pose graph that may be generated using sensor data collected during the passes illustrated at FIG. 2A.

FIGS. 3A and 3B illustrate a pictorial flow diagram of an example process for adjusting a pose graph using a soft-constraint optimization and generating a map. The soft sensor data alignment and resultant adjustment may be based on sensor data that is a different type than a type of sensor data used to generate an original pose graph.

DETAILED DESCRIPTION

Figure 3A:
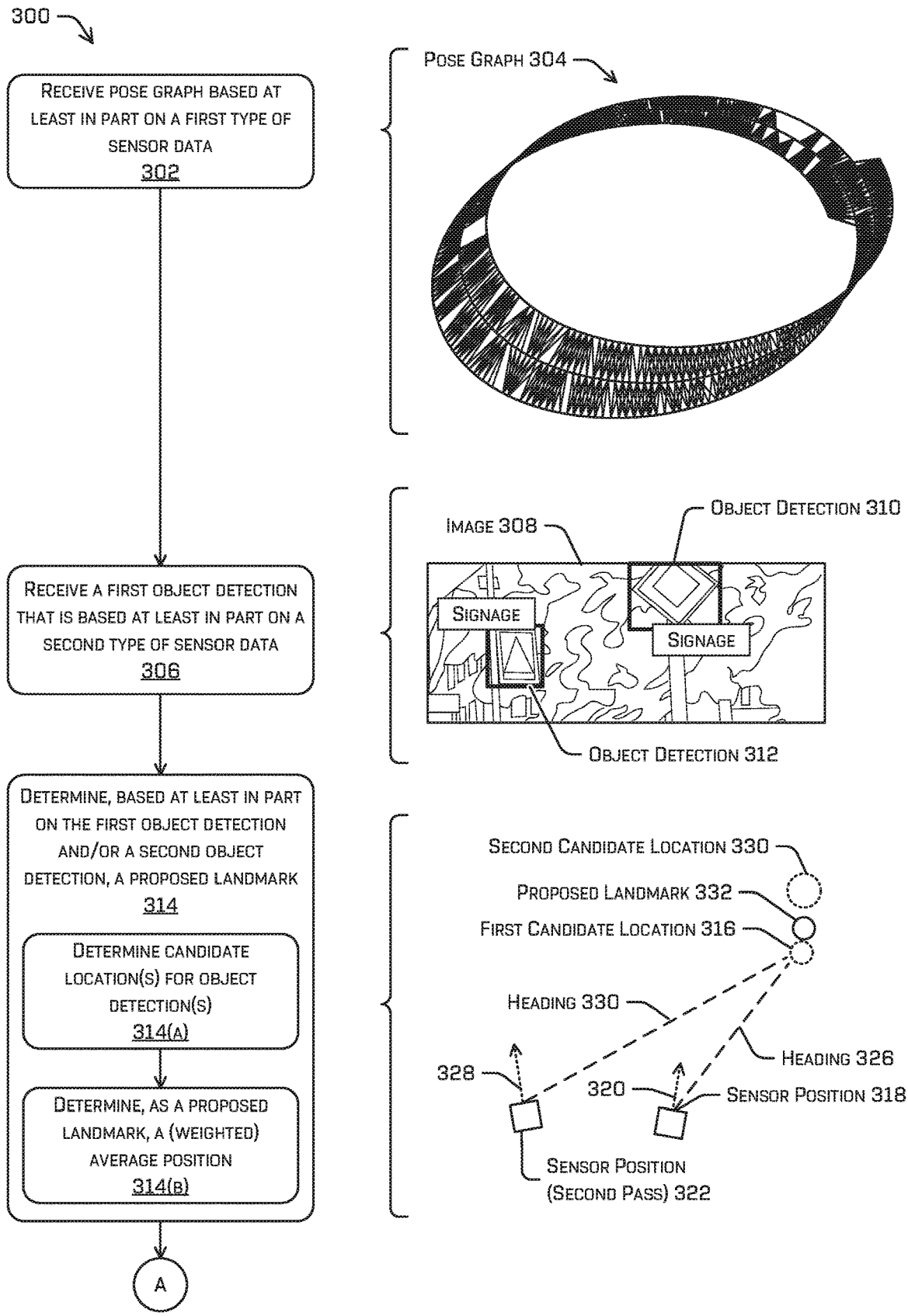

As discussed above, sensor data may be collected to generate a map of an environment. More specifically, an autonomous vehicle may transmit sensor data to a remote computing device, which may use the sensor data to generate a map of the environment. Such a map may comprise, for example, a two- and/or three-dimensional representation defined by, for example, a mesh, wire frame model, polygons, surfels (e.g., polygons associated with individual color and/or intensity), and/or the like. The remote computing device may transmit such a representation to an autonomous vehicle, which the autonomous vehicle may use to navigate an environment safely and efficiently. For example, the autonomous vehicle may use the map to determine where the vehicle is in the environment, where a drivable surface area is, where static objects are in the environments, where drop-off locations exist, where landmarks are, etc., and may use such determinations to determine a trajectory for controlling motion of the autonomous vehicle. Additionally or alternatively, the autonomous vehicle may use the map to correctly locate dynamic objects within the environment that the autonomous vehicle detects using sensor data received by the autonomous vehicle. For example, the vehicle may use the map to determine a likelihood that an object is occluded and/or to increase or decrease a confidence that an object exists at a certain location (e.g., a dynamic object like a pedestrian is unlikely to be in the same position as a static object, such as a stop sign).

To generate the map, a computing device may determine a pose graph (a graph representation of the multiple poses as nodes and associations, e.g., constraints, between such poses as edges in the graph, etc.) and use the pose graph to align sensor data captured at different vehicle poses. This aligned sensor data may be used to generate the three-dimensional model of the environment. Generating the pose graph may include estimating a first pose (i.e., position and/or orientation) of the vehicle associated with a first sensor data set and the relation of that first pose to another pose of the vehicle. For example, the vehicle may receive lidar data from one or more lidar sensor associated with the vehicle. This lidar data may include sets of data points, also referred to herein as point clouds, with each set of data points corresponding to a particular pose of the vehicle within the environment.

Estimating poses of the vehicle may include modifying a first estimated pose to increase a fit of/reduce the distance between a subset of lidar points of a first set of lidar points from a subset of lidar points of a second set of lidar points associated with a second estimated pose. A factor (constraint) between two poses may also be modified to fit the sets of sensor data together (e.g., by reducing the distance between lidar points of the two sets). The factor between these two estimated poses may be a constraint that identifies how the vehicle moved from one pose to the other. In some examples, the estimated poses and factors therebetween may be based at least in part on the sensor data (e.g., lidar data) and/or ancillary sensor data, such as inertial measurement unit (IMU) sensor data, odometry data, and/or the like. For example, the vehicle may use IMU data and/or odometry data to instantiate the pose estimates and/or a factor between two pose estimates and may refine these initial estimates using the lidar data. The resultant pose graph may be a graph whose nodes correspond to the poses of the vehicle at different points in space and whose edges represent constraints between the poses. The latter are obtained from observations of the environment or from movement actions carried out by the robot.

However, generating such a pose graph may include the notoriously difficult problem of determining what sensor data, such as lidar data, corresponds to a same landmark, such as a building, traffic light, tree, bush, signage, mailbox, or any other static object. For example, the vehicle may be equipped with one or more lidar sensors and may pass a same landmark from a same or different angles as the vehicle travels in the environment. It is an exceedingly difficult problem to identify a traffic light as being the same traffic light that may have been identified in early lidar data, for example. For example, in a dense urban environment, different intersections or even the same intersection (from a different angle) may look uniform, making it difficult to identify which lidar data corresponds with a same object. However, such knowledge may be extremely useful in ensuring the pose graph is optimized (reflects the most accurate path) as they provide unique information about the environment. Lidar-generated pose graphs may therefore include some poses in the pose graph that are highly inaccurate. Moreover, lidar-generated pose graphs are very sensitive to outliers—due to the hard constraints used for lidar-generated pose graphs, the presence of an outlier may cause cascading errors through the pose graph. For example, hard constraints may include identifying sensor data as being associated with a same landmark and forcing the sensor data to align.

According to some techniques for generating a pose graph, a hard constraint is used that identifies different sets of sensor data as being associated with a same object and forces the pose graph optimization to merge the different sets of sensor data (or at least attempt to merge the different sets of sensor data). This method may be error prone and may require extensive hand pruning and other human involvement to correctly identify landmarks. To further complicate matters, point clouds are not entirely humanly comprehensible since they may include tens or hundreds of thousands or millions of lidar points, making it hard to tell, at times, when two sets of sensor data include portions that are associated with a same landmark.

The techniques discussed herein introduce a soft-constraint technique for refining an initial pose graph. In at least some such examples, as opposed to a hard constraint of associating data with a single data, an inter-optimization process is described which may determine which points should be associated with a same landmark and which may be outliers (a soft-constraint). The soft-constraint technique uses a different kind of sensor data than the type of sensor data used to construct the initial pose graph. For example, the soft-constraint technique may use image data and/or radar data to refine a pose graph determined using IMU data, odometry data, and/or lidar data. Different combinations thereof are possible, however. The soft-constraint technique may include determining a first object detection based at least in part on this different type of sensor data (e.g., detecting an object based at least in part on image data or radar data) when the vehicle is at a first pose in the environment. Determining the object detection based at least in part on this sensor data may include determining a classification associated with the object (e.g., "pedestrian," "foliage," "building," "bench," "mailbox," "statue"), a region of interest (ROI) that identifies a portion of the sensor data associated with the object (e.g., a bounding box or other shape, a mask, instance segmentation, semantic segmentation), and/or a confidence score associated with the object detection indicating a likelihood (e.g., posterior probability) that the object detection is correct.

The techniques may include using the object detection to determine a vehicle or sensor-relative heading. For example, the sensor positions and orientations on the vehicle may be known. A sensor-relative heading may be determined based at least in part on an offset of the ROI from a center of the frustum of the sensor. This determination may result in a sensor-relative heading of the object, but does not include a depth or distance from the vehicle at which the vehicle lies. Note that the heading may indicate an altitude and/or azimuth relative to a center of the sensor frustum, although other coordinates may be used.

Once at least one more object detection identifying a same classification type has been detected from a different pose, a second heading associated with that object detection may be used to triangulate an estimated location of the object (e.g., using the first heading determined from the first object detection and the second heading determined from the second object detection). This estimated location is also called a candidate location herein. As additional object detections are received, this candidate location may be refined, and more candidate locations of the landmark may be generated. For example, a candidate location may be generated for every n static object detections (i.e., landmarks), where n is a positive integer equal to or greater than two. In some examples, n may be two, three, or four.

In some examples, the techniques may include determining a proposed location (which may include a longitudinal, latitudinal, and/or altitudinal position and/or an extent of the object) based at least in part on these location estimates. In some examples, determining the proposed location may be based at least in part on the confidence scores associated with the object detections in addition to the candidate locations determined by using different sets of two, three, or n object detections. For example, determining the proposed location may be part of the adjustment to the initial pose graph. Regardless, determining the proposed location may include determining an initial position of the proposed location based at least in part on an average location of the candidate locations. Additionally or alternatively, the proposed location may be determined based at least in part on a weighted average where the weights are assigned based at least in part on the confidence scores associated with the different object detections upon which the candidate locations were based.

The candidate locations (determined based on object detections) and the proposed location (determined based on the candidate locations) may be used to conduct a soft-constraint optimization of the initial pose graph that was determined using lidar or another type of sensor data. The soft-constraint optimization may modify the pose graph by altering an estimated pose of the pose graph, the candidate location(s), and/or the proposed location based at least in part on a loss function that is a function of distance from the proposed location. The soft-constraint optimization may include altering the estimated pose (and/or other estimated pose(s)), candidate location(s), and/or proposed location to reduce a distance between the candidate location(s) and the proposed location based at least in part on a loss function that has a characteristic that allows candidate location(s) originally associated with a proposed location to not merge to that propose location (unlike a hard constraint that forces this merging). For example, the loss function may be a pseudo-Huber loss, Cauchy loss, German-McClure loss, or the like.

The loss function used by the soft-constraint optimization may be a function of distance. The loss function may have a convergence basin that has a shape that is based on an object detection type. To simplify, the convergence basin may be said to have a distance at which candidate locations outside the distance have negligible impact on the determination of the proposed location. This distance may be defined by the object classification type (as determined based at least in part on radar or image data, for example). Moreover, the distance may be multi-dimensional. For example, the object classification "vehicle" may be associated with a loss function having a convergence basin that has a first longitudinal distance, a second lateral distance, and a third vertical distance. These distances may be the same or different than each other and may differ from the distances associated with a different object. For example, the loss function associated with the object classification "pole" or "traffic signage" may have a much larger vertical distance and smaller longitudinal and/or lateral distances than those associated with the object classification "vehicle."

Note that referring to this point in the loss function's convergence basin is a simplification to speak of a point at which the loss function highly attenuates a weight associated with any candidate locations outside that distance. It is understood that the loss function may be any of a number of loss functions, such as Huber loss function, a Cauchy loss function, a Lorentzian loss function, mean squared error, and/or the like. However, for the sake of simplicity, the discussion herein uses the term "distance" to describe the general region at which the loss function starts to highly attenuate the influence of candidate locations on a proposed location during the soft-constraint optimization.

Candidate locations (generated from object detections indicating a same type of object classification) within the distance of the proposed location may, during the optimization, be subject to alteration and may influence the proposed location. During the soft-constraint optimization, a candidate location may be altered by altering respective estimated pose(s) associated with the object detection(s) from which the candidate location was determined. Candidate locations that are further from the proposed location may not be influenced as heavily (due to the loss function's characteristics), i.e., they may not be moved as much/as far during the soft-constraint optimization—and they may influence alterations to the proposed location less heavily, until candidate locations beyond the distance may not influence alterations to the proposed location at all (or very little) and may not be altered based on the proposed location. The proposed location itself may be altered as a function of the alteration to the candidate locations such that the proposed location seeks to merge the candidate locations and proposed location into a single location (in a fully optimized example), although it is understood that the optimization may be stopped when the distance between the candidate locations and between the candidate locations and the proposed location is less than a threshold distance. However, a distant candidate location (i.e., a candidate location outside the loss function's distance of a proposed location for that candidate location's object classification type) may be within the loss function's distance of a second different proposed location that the distant candidate location is local to and may influence and be influenced by.

Note that a candidate location used as part of a group of candidate locations to generate a proposed location and therefore originally intended to merge with the other candidate locations of the group and/or the proposed location may not actually end up merging. Merging means being moved sufficiently to be within a threshold distance of the proposed location and/or the candidate location(s) associated therewith. This failure to merge is a benefit of the soft-constraint optimization since this candidate location isn't forced to merge. In other words, although the candidate location was originally identified as potentially being associated with a landmark, the loss function's operations in the optimization may not cause that candidate location to end up merging with other candidate locations associated with that landmark and that is the intent of using such a soft-constraint optimization. This goes against current rationale. In such examples, the measurement previously associated with a single landmark may be designated as an outlier and will have no influence on subsequent optimizations of the pose graph, thereby yielding improved optimizations overall.

This process of altering the estimated pose(s) of the pose graph during the optimization may occur over a portion of or the entire pose graph. In such an example, the optimization may alter different estimated poses to reduce the distances associated with different groups of candidate locations, each of which may have a respective proposed location associated therewith. In some examples, the optimization may alter estimated pose(s) and group members (i.e., where a group includes two or more candidate locations and a proposed location) to reduce an average distance of the distances determined for the different groups. This optimization may occur over a portion of or the entire pose graph. In the former example, the average distance may be an average distance of distances determined for groups in that are within the portion of the pose graph for which the soft-constraint optimization is being conducted.

In some examples, the soft-constraint optimization may reduce the distance between candidate locations for a single proposed location or multiple landmarks. Regardless, the soft-constraint optimization may continue altering the estimated pose, candidate locations, and proposed location until an end condition. The end condition may include, for example, determining that the candidate locations have merged—i.e., that the candidate locations are within the loss function distance of the proposed location/the candidate locations are located within the convergence basin of each other—which may indicate that the candidate locations are within a tolerance distance based on what would be expected for noise; a specified number of iterations; once a number of groups of candidate locations and proposed locations less than a threshold number of groups fails to merge; and/or the like. Regarding the last end condition, when multiple groups of candidate locations and respective proposed locations are part of the optimization, not all of the groups may merge after a first iteration and the optimization may end after a number of iterations have been executed or after less than a specified number of groups are failing to merge, whichever comes first. For a group that is failing to merge, the proposed location may be deleted or an additional proposed location may be added and the optimization may be restarted or a portion thereof related to the newly deleted or added proposed location(s) may be put through the soft-constraint optimization.

The soft-constraint optimization discussed herein increases the accuracy of the pose graph and map data that may be generated based at least in part on the pose graph. This map data may be transmitted to a vehicle. The vehicle may use the map data to navigate an environment, including for use in simultaneous localization and mapping (SLAM), detecting blind corners, and the like. The techniques discussed herein may also reduce the time to generate an accurate pose graph and may merge portions of the pose graph that couldn't otherwise be merged using hard constraint(s). This may reduce or eliminate highly invalid alignments of sensor data and may reduce or eliminate the need for a human to supervise the process.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a mapping component 114, and/or system controller(s) 116. Although depicted in FIG. 1 for illustrative purposes, it is understood that the mapping component 114 may reside in/on a separate computing device (or otherwise) than any one or more of the other components.

In some examples, a mapping component 114 at the vehicle 102 may differ than a mapping component at a remote computing device. For example, the mapping component 114 at the vehicle may include components for localizing the vehicle 102 within the environment based on a map (e.g., the mapping component 114 may include a SLAM component). Additionally or alternatively, the mapping component 114 may include a component that generates a rough pose graph based at least in part on sensor data collected by the vehicle as part of SLAM operations. This pose graph may differ from a pose graph generated by a mapping component at the remote computing device based on the sensor data in that the rough pose graph generated at the vehicle may be used for localization of the vehicle 102 to navigate the environment and/or corroborate a canonic map, whereas the pose graph generated at the remote computing device may be used to generate a canonic map that may be transmitted to one or more vehicles. Regardless, the mapping component 114 may use a first type of sensor data that indicates depth data, such as lidar data and/or ToF data, to generate a first pose graph and the techniques discussed herein may use a second type of sensor data to refine the first pose graph. The second type of sensor data may include, for example, image data, radar data, and/or any other sensor data that the perception component 110 may use to determine an object type.

Note that, as used herein, a pose graph may include a factor graph that comprises pose nodes and edges (factors/constrains), where a node indicates a pose (i.e., position and orientation (e.g., two- or three-dimensional heading) of the vehicle within the environment/map) of the vehicle and an edge (also called a factor) indicates a set of constraints that define a relation of one pose (node) to another pose (node). In some examples, a confidence score, such as a covariance, may be associated with an edge. In some examples, the vehicle may determine a rough/preliminary pose graph based at least in part on sensor data, including odometry data and/or inertial data. In some examples, a pose node may be associated with sensor data received by the vehicle over a time window.

The preliminary pose graph and/or sensor data may be transmitted to a remote computing device, which may use a first type of sensor data (a type of sensor data that includes depth data) to refine the preliminary pose graph into a first pose graph. For example, refining the preliminary pose graph into a first pose graph may include altering a pose node based at least in part on one or more factors associated with the pose node and the covariances associated therewith to reduce a distance between points in the first type of sensor data that are associated with a same object (i.e., a hard constraint). According to the techniques discussed herein, this first pose graph may be further refined into a final pose graph using sensor data and/or perception data suitable for detecting object types, such as image data, radar data, and/or the like. This final pose graph may be used to determine that different sets of sensor data associated with different nodes are associated with a same object and may be used to generate a map. This map may include a representation of surfaces in the environment, such as a two- and/or three-dimensional model that may include a polygon mesh, wire frame model, and/or the like to represent the surfaces.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps (such as a map determined according to the techniques discussed herein, localization information (e.g., where the vehicle 102 is in the environment relative to a map and/or features detected by the perception component 110), and/or the like. In some examples, the perception component 110 may comprise a pipeline of hardware and/or software, which may include one or more GPU(s), ML model(s), Kalman filter(s), and/or the like.

The trajectory 118 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. In some examples, the trajectory 118 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification, a region of interest (ROI) identifying a portion of sensor data associated with the object, and/or a confidence score indicating a likelihood (e.g., posterior probability) that the object classification is correct and/or a confidence score that the ROI is accurate. For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, velocity, acceleration, and/or heading of that object.

To give a concrete example, the vehicle 102 may receive sensor data including image data (from one or more image sensors), including image 120, and/or other sensor data associated with the environment, such as lidar data, radar data, ToF data, and/or the like. The perception component may detect and classify objects in the environment. For example, the perception component may detect dynamic objects, such as a cyclist, vehicle, pedestrian, or the like, and/or static objects, such as poles, traffic signage, general signage, a drivable surface, sidewalk, public furniture, building, etc. As discussed herein, static object detections may be used to refine the pose graph determined by the mapping component 114. In the depicted example, static objects having a same object classification detected by the perception component 110 may include various signs (and/or their poles, although for the sake of simplicity, this example depicts detecting just the signs). For example, the perception component 110 may determine, based at least in part on the image 120, an object detection 122 comprising an ROI depicted as a bounding box at 122 and an object classification "signage" associated with sign 124. Additionally or alternatively, the perception component 110 may determine object detection 126 associated with sign 128 and object detection 130 associated with sign 132. The perception component may additionally or alternatively determine a confidence score associated with the object detection 122, which may comprise a sub-confidence score associated with the ROI and/or sub-confidence score associated with the object classification.

In the illustrated example, the image 120 and object detections 122, 126, and 130 may be determined by the vehicle 102 as the vehicle executes trajectory 118, as part of a first pass of this portion of the environment. At a different time, the vehicle 102 may receive sensor data that includes sensor data indicative of this part of the environment, such as sensor data that includes a portion that is associated with sign 124. For example, the vehicle 102 may pass this portion of the environment on the same roadway in a same direction as trajectory 118, a different direction, such as second pass 134; or even from a different roadway that is close by. In any of those examples, sensor data received by the vehicle from sensor(s) 104 may include a portion that is associated with sign 124, for example. The techniques discussed herein refine the manner in which sensor data may be aligned to identify a same object without using canonic location knowledge, such as by using a GPS sensor, which may not always be available due to weather, tunnels, tall buildings, or the like.

Note that, although the depicted example is based on an image, the perception component 110 may generate object detection(s) based on other types of sensor data, which may be used to refine the pose graph, as discussed further herein. For example, the perception component 110 may detect an object using a radar detection and may classify that object based at least in part on a radar cross section (RCS) associated with the object. Image and/or radar-based detections may be used for the techniques discussed herein, although it is understood that radar-based detections include depth and therefore do not need to have depth triangulated, as imaged-based detections may (where stereo or other depth-based images aren't available).

The data produced by the perception component 110 may be collectively referred to as perception data. Once the perception component 110 has generated perception data, the perception component 110 may provide the perception data to the planning component 112. The perception data may additionally or alternatively be stored in association with the sensor data as log data. This log data may be transmitted to the mapping component 114, which may execute on the computing device(s) 106 and/or at a remote computing device (unillustrated in FIG. 1 for clarity).

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the controller(s) 116 may comprise software and/or hardware for actuating drive components of the vehicle 102 sufficient to track the trajectory 118. For example, the controller(s) 116 may comprise one or more proportional-integral-derivative (MD) controllers.

Example Pose Graph

FIG. 2A illustrates an example path 200 that a vehicle 102 may take multiple times (multiple passes of a same location). For the sake of making this a simple example, the path 200 is merely a circle, such as may be accomplished by the vehicle 102 in a parking lot. In the depicted example, the vehicle 102 may travel the path 200 three times, making three passes of the same location(s) in an environment, which may include a pole 202 (e.g., a sign pole, flag pole, light pole). While the vehicle 102 is travelling this path, sensor(s) of the vehicle 102 may collect sensor data, such as lidar data, radar data, image data, odometry data, inertial data, and/or the like. In some examples, a mapping component may determine a pose graph 204 that is based on these three passes. The mapping component may determine pose graph 204 based at least in part on odometry data and/or inertial data and may associate collected sensor data with respective nodes. This association of a set of sensor data with a pose node of the pose graph 204 may indicate that the set of sensor data was collected within a time window or position range of the pose indicated by the pose node.

FIG. 2B illustrates a three-dimensional representation of the pose graph 204 that may be generated using sensor data collected during the passes illustrated at FIG. 2A. Pose nodes are depicted in FIG. 2B as the vertices of association factors, which are depicted as lines. For example, pose node 206 is one such pose node and association factor 208 is a factor between a pose node of one pass and a pose node of another pass. Note that factors between pose nodes of a same pass are referred to herein as constraints or factors and that factors between pose nodes of different pose nodes are referred to herein as association factors or factors (where the context is clearly talking about two different passes). The (circular) curves between poses of a same pass are the constraints between pose nodes of a same pass, such as factor/constraint 210 between two pose nodes of a same pass. This constraint identifies a translation and/or rotation between a first pose node and a second pose node and a covariance associated therewith that indicates how likely the constraint is correct in any number or combination of variables.

For example, the constraint 210 may identify a distance between, steering data or difference in headings, and/or the like that may define how a vehicle in the first pose would come to arrive at the second pose. In some examples, the constraint 210 may additionally or alternatively include velocity and/or acceleration, if time is accounted for in the pose graph. In some examples, a first confidence score may be associated with the constraint 210 indicating a likelihood that the constraint is correct, and a second confidence score may be associated with the association factor 208 indicating a likelihood that the two pose nodes associated by the association factor 208 are associated with a same general area of the environment. In some examples, the association factor 208 may be a closed-loop factor, although in other examples this may not be the case, such as where the association factor 208 merely identifies that two poses are near enough to be associated with sensor data that includes the same object detections.

During each of the passes, the vehicle 102 may receive sensor data and determine perception data including an object detection based at least in part on the sensor data. When a same object re-appears in sensor data, such as by passing an object again, multiple object detections may be generated in association with that object. For example, during the second pass near the pole 202, the vehicle 102 may generate two object detections associated with the pole from two different poses, a first object detection at a first pose and a second object detection at a second pose. Since non-stereo images do not include depth data, these two (or more) object detections may be used to triangulate a candidate location of the pole. Since the vehicle 102 estimates a pose of the vehicle as part of the mapping component's operations and since sensor positions and orientations on the vehicle may be known, the object detections may be used to generate an estimate of the location of the object in the environment.

For example, the vehicle may determine a first heading 212 using a first ROI generated by the vehicle as part of a first object detection at a first pose and a second heading 214 using a second ROI generated by the vehicle as part of a second object detection at a second pose. The ROIs may be used to determine a longitudinal and lateral position of the pole 202 and, using triangulation, the vehicle 102 may estimate a depth of the pole 202 from the sensor, resulting in candidate object location 216, when conjoining the longitudinal and lateral positions and the depth. Note that a candidate location is therefore dependent on the estimated pose of the vehicle and the resultant pose node, as this affects the apparent object location.—as the estimated pose changes, so too will the apparent location of the object. As illustrated in FIG. 2B, similar candidate object detections may be generated for other passes that the vehicle has made of the location—candidate object location 218 associated with the first pass and candidate object location 220 associated with the third pass, for example. Note that, although different candidate locations are shown as being associated with different passes, multiple candidate locations may be generated for a same object in a same pass. In other words, during the first pass, the vehicle 102 may generate one or more candidate locations associated with pole 202; during the second pass, the vehicle 102 may generate one or more candidate locations associated with pole 202; and so on. Further note that, according to the techniques discussed herein, the vehicle 102 does not need to know that the candidate object locations 216, 218, and 220 are associated with a same object. Instead, it is enough for the techniques discussed herein for the vehicle 102 to generate candidate locations for an object using object detections of a same object classification (as indicated by the object detection) and that is estimated to be within a threshold distance of another object detection. These image- or radar-based object detections may be used by the techniques discussed herein to further refine the pose graph 204.

Example Process

FIGS. 3A and 3B illustrate a pictorial flow diagram of an example process 300 for refining a pose graph using a soft-constraint technique. The soft sensor data alignment and resultant adjustment may be based on sensor data that is a different type than a type of sensor data used to generate an original pose graph that is being refined. In some examples, example process 300 may be executed by a remote computing device that receives sensor data, perception data, and/or a preliminary pose graph (e.g., generated as part of localizing the vehicle, such as according to a SLAM process) from a vehicle. This remote computing device may generate a first pose graph based at least in part on the preliminary pose graph using a first type of sensor data and may refine this first pose graph using a second and/or third type of sensor data. The final pose graph may be used to align sensor data and/or generate a representation of an environment indicated by the sensor data. The remote computing device may transmit the aligned sensor data and/or the map to one or more vehicles to be used as part of controlling those vehicles, such as for localization within the map, determining a trajectory for controlling a respective vehicle, and/or planning pickup and/or drop-off point(s) for a passenger.

Turning to FIG. 3A, at operation 302, example process 300 may include receiving a pose graph 304 that is determined based at least in part on a first type of sensor data, according to any of the techniques discussed herein. For example, the pose graph 304 may be a preliminary pose graph determined by SLAM techniques by the vehicle or the remote computing device based at least in part on odometry data, inertial data, and/or lidar data received at the vehicle. As discussed above, the pose graph 304 may include multiple pose nodes, constraints therebetween, and/or association constraints between pose nodes of different passes. For example, a first pose node may indicate a position and orientation of the vehicle and may be associated with a set of sensor data received while the vehicle was at or near the first pose (e.g., within a time or distance range of the first pose). The first pose node may be associated with a second pose node via a first factor/constraint that identifies how the vehicle moved from the first pose to a second pose and the first factor may include a first confidence score indicating how confident the mapping component is that the constraint is correct. The first pose node may additionally or alternatively be associated with a third pose node of a different pass (i.e., a different time the vehicle passed by the location in the environment from a same or different angle) via a second factor associated with a second confidence score.

At operation 306, example process 300 may include receiving a first object detection that is based at least in part on a second type of sensor data, according to any of the techniques discussed herein. For example, the first pose node may be associated with a first set of sensor data and perception data that was generated based at least in part on the first set of sensor data. This perception data may include an object detection identifying a portion of the first set of sensor data as being associated with a static object (e.g., indicated by an ROI), an object classification associated with the object, and/or one or more confidence scores (e.g., a likelihood that the ROI is correct, a likelihood that the object classification is correct). For example, FIG. 3A depicts examples of two such object detections based on image 308, object detection 310 and object detection 312. Note that, although FIG. 3A depicts the second type of sensor data as being image data, the second type of sensor data may include any sensor data from which a perception component may detect an object, classify an object, and/or estimate a candidate location for an object (whether triangulation is needed or not).

At operation 314, example process 300 may include determining, based at least in part on the first object detection and/or a second object detection, a proposed location, according to any of the techniques discussed herein. Determining a proposed location may include, at operation 314(a), determining a candidate location based at least in part on an object detection and, at operation 314(b), determining, as a proposed location an average position of two or more candidate locations. Additionally or alternatively, the proposed location may be based at least in part on projecting a ray from a camera center or an ROI center (from the object detection) for object detections that have a same classification and determining a region intersected by the projected rays.

At operation 314(a), example process 300 may include determining a candidate location based at least in part on an object detection, according to any of the techniques discussed herein. Where depth data isn't included as part of the object detection or the sensor data, operation 314(a) may include determining a candidate location using triangulation and two or more object detections that are estimated to be associated with a same object. For example, this may be available when an object is associated with a same track generated by the vehicle. Note that a track associates different object detections generated for sensor data received at different times as being associated with a same object. A track may further aggregate data about the object, such as a unique object identification number, a state of the object (e.g., dynamic, static), a position and/or orientation of the object, a velocity and/or acceleration of the object (for dynamic object), and/or the like. Essentially the track indicates that different object detections are associated with a same object, such as may be used in image- or radar-based object tracking.

In an example where a track is available or two object detections are otherwise determined to be associated with a same object, the two (or more) different object detections may be used to triangulate a depth of the object from a position of the sensor(s). In some examples, rays may be unprojected through an image coordinate via a frustum of a camera and intersecting points for such same object detections may be used to estimate a three-dimensional location. For other types of sensor data, such as radar data, the depth data may be natively available as a part of the sensor data. One or more candidate locations identifying where an object exists in an environment may be determined for the same pass that the vehicle makes of the object. In some examples, additional candidate locations may be generated when the vehicle makes additional pass(es) of the object, from the same or different directions, such as by passing the object on the same roadway at a different time and from the same or the opposite direction or from a different roadway from which the object is represented in the sensor data.

FIG. 3A illustrates a top-down view of an example first candidate location 316 that may be generated for a sensor data type that doesn't include an indication of depth. Note that a candidate location may have two or more dimensions and may define a point or an area. For example, the illustrated candidate locations are depicted as circles, although the candidate location may be represented as a cylinder, rectangle, polygon, or any other appropriate shape. Although the techniques discussed herein may be applied in three dimensions, the discussion is simplified herein by discussing two dimensions.

In some examples, the first candidate location 316 may be determined based at least in part on a first object detection detected when a sensor of the vehicle was at a first pose, i.e., sensor position 318 and orientation 320, (during a first pass) and a second object detection when the sensor of the vehicle was at a second pose (during a second pass), i.e., sensor position 322 and orientation 324. To determine the first candidate location 316, an apparent heading 326 towards the object relative to the first pose of the sensor may determined based at least in part on the ROI indicated by the object detection. For example, an orientation of the sensor may be known, relative to the estimated pose of the vehicle, as determined as part of the preliminary pose graph. This orientation of the sensor and the location of the ROI within an image may be used to estimate a relative heading of the object from an orientation of the sensor (and/or the vehicle). Heading 328 may similarly be determined based at least in part on a second object detection and, together, heading 326 and heading 328 may be used to triangulate the first candidate location 316. FIG. 3A also depicts second candidate location 330, which may be a candidate location determined based at least in part on object detection(s) determined using a different type of sensor data, such as radar data, or a third and fourth or more object detections determined using the same type of sensor data, such as during a third pass of the vehicle from a same or different roadway.

In some examples, determining a candidate location may further comprise determining a confidence score associated with the candidate location. The confidence score is represented as a diameter of the circles, where a larger diameter indicates a lower (less confident) confidence score. The confidence score may be based at least in part on the confidence score(s) of the object detection(s) used to generate the candidate location. For example, a first confidence score associated with the ROI and/or a second confidence score associated with the object classification or the existence of the object detection (e.g., such as may be associated with a pixel or other sensor data portion for an instance segmentation or semantic segmentation) may be used to determine the confidence score associated with a candidate location.

At operation 314(b), example process 300 may include determining, as a proposed location 332, an average position of candidate locations, according to any of the techniques discussed herein. Determining the proposed location 332 may be part of the soft-constraint optimization and may include an initialization step of proposing a location to which the candidate locations may merge during the soft-constraint optimization. For example, the proposed location 332 may be an average location of candidate locations within a threshold distance of the proposed location. In an additional or alternate example, the proposed location 332 may be a weighted average position of candidate locations within the threshold distance, where the weights are determined based at least in part on the candidate scores associated with the candidate locations.

In some examples, the proposed location 332 may be used by the soft-constraint optimization as a point towards which the soft-constraint optimization attempts to move the candidate locations using the loss function. For example, the soft-constraint optimization may alter a pose node (which thereby modifies a candidate location that is based at least in part on the pose node) to reduce a distance between the proposed location and the candidate location, as discussed further below. Note that, in such an example, the proposed location 332 may be updated as part of the soft-constraint optimization following an iteration of the soft-constraint optimization. In an additional or alternate example, the soft-constraint optimization does not determine a proposed location (skipping operation 314(b) and, in such an example, the soft-optimization attempts to merge a group of candidate locations to a single point (or within some tolerance). This does not mean that the optimization actually merges all of the candidate locations and, in fact, may fail to merge one or more candidate locations. In some examples, a proposed location 332 may be generated for a group of candidate locations that number greater than or equal to n and are within a threshold distance of each other, where n is a positive integer greater than or equal to two.

Turning to FIG. 3B, at operation 334, example process 300 may include altering, as an adjusted pose, the pose estimate, the first candidate location, the second candidate location, and/or the proposed location to reduce a distance between the first candidate location, the second candidate location, and the proposed location, according to any of the techniques discussed herein. Operation 334 may include the soft-constraint optimization discussed herein. In some examples, this soft-constraint optimization may be initiated once candidate locations have been created for the environment or portion of the environment for which a pose graph and/or map is being generated.

Since there may be multiple proposed locations and respective groups of candidate locations upon which these proposed locations are based, for simplicity, the discussion herein includes a single group of candidate locations upon which a proposed location is based, although it is understood that the operations discussed herein may affect the other candidate locations, proposed locations, and pose nodes (at a very minute scale, in some cases). Operation 334 may comprise altering the candidate locations and/or the proposed location itself to reduce a distance between the candidate locations and the proposed location or, in an example where a proposed location isn't used, between the candidate locations. Altering a candidate location may comprise altering the pose node(s) that the candidate location is based on. As discussed above, the pose of the vehicle indicated by a pose node informs the direction that the sensor is pointing and therefore the apparent heading of a detected object relative to the sensor. Changing the pose node thereby alters the candidate location(s) based thereon. Moreover, altering a proposed location may be based at least in part on altering the underlying candidate locations. Altering the proposed location may be accomplished after the candidate locations within a threshold distance of the proposed location have been altered, such as by re-determining an average position of the candidate locations. In some examples, the altering may be further based at least in part on a degree of alignment of sensor data associated with the pose nodes upon which the candidate locations are based.

In some examples, the soft-constraint optimization may utilize a loss function to weight how much to alter a candidate location and/or proposed location. For example, the greater in magnitude the weight, the more the candidate location may stay in place and/or the more other candidate locations may move towards the candidate location (the lower the weight, the more the candidate location may move toward other candidate location(s)/the proposed location). Additionally or alternatively, the greater in magnitude the weight, the more the candidate location may move (the lower the weight, the less the candidate location may move toward a proposed location/other candidate location(s)).

Regardless, the weight determined by the loss function may be a function of error, which may include distance from a proposed location or from a medoid or mean of a group of candidate locations. Moreover, the loss function may differ for different types of objects, as identified by the object detections underlying the candidate locations. For example, the loss function may have a convergence basin that is shaped differently based on the object type the loss function associated with the object classification "pole" or "signage" may have relatively small lateral and longitudinal (x-, y-) extents, but a large vertical (z-) extent, whereas the loss function for the object classification "fire hydrant" may have a much smaller vertical extent, despite having relatively similar lateral and longitudinal extents. This convergence basin is simplified in FIG. 3B by representing a portion of the convergence basin outside which the weights determined by the loss functions diminish. This portion is represented in two dimensions as a circle having a radius that defines a distance 336. Note that, if the loss function is based on a Gaussian distribution, this portion may be defined by a standard deviation or a multiple of a standard deviation (e.g., $2.5\sigma$, $3\sigma$).

The loss function may include a Cauchy loss, Huber loss, Blake-Zisserman loss, Tukey loss, German-McClure loss, Welsch loss, and/or the like. The type of loss function chosen will affect the relationship of the error to the weight determined. For example, a pseudo-Huber loss may result in a weight that increases as error increases up to a maximum error (the weight approaches the maximum error at infinity). In contrast, for a Cauchy or German-McClure loss, the weight increases as the error increases, up until a point associated with a moderate error, after which the weights decrease (how quickly differs between Cauchy and German-McClure). This point at which the weights start to decrease is depicted as the distance 336—the point at which the weights stop increasing and start to decrease. Although this point is defined as a radius for a circle, it is understood that the loss function may be defined laterally, longitudinally, and vertically, such that the loss function has a lateral point, longitudinal point, and/or vertical point at which the weights start decreasing.

For example, FIG. 3B depicts the loss function gradient 338 for a Cauchy loss function. Since the error may be based at least in part on distance from the proposed location 332, for simplicity this example discusses the error as a distance between the proposed location and a respective candidate location, such as candidate location 330 or candidate location 340, which is an outlier. In some examples, the error may further be based at least in part on the confidence score associated with the candidate location. Since candidate location 330 is a moderate error, i.e., an error that is at or near distance 336, the loss function may determine a greater weight in association with the candidate location 330, resulting in altering the candidate location more heavily than a candidate location closer to the proposed location 332 or the outlier candidate location 340. In some examples, the candidate location 340 may be within the convergence basin for a different proposed location and may move towards that other proposed location instead of landmark 332.

Note that the alterations to the pose node(s) (thereby altering the candidate locations and/or proposed locations) may be further based at least in part on a covariance associated with a constraint between two pose nodes, whether the factor is between two pose nodes of a same pass, a loop-closure factor, or between pose nodes of two different passes (an associative factor). This constraint may identify the extent to which a pose node may be altered and/or how much/how easily it may be altered (via the covariance). Additionally or alternatively, the alterations may be based at least in part on determining a degree of alignment of two sets of sensor data associated with two pose nodes.

Ultimately, the alterations to pose nodes of operation 334 may result in an updated pose graph 342. These alterations to the pose nodes may result in decreasing the distance between first candidate location 316, second candidate location 330, and/or proposed location 332. Outlier candidate location 340 (and the pose nodes upon which the candidate location 340 is based) may be unaffected or only minorly altered. In an example where candidate location 340 is close to the convergence basin of a different proposed location, the candidate location 340 may have moved towards that different (unillustrated) proposed location.

At operation 344, example process 300 may include determining a number of candidate locations (and/or proposed locations) associated with the update pose graph or a region thereof that are failing to merge, according to any of the techniques discussed herein. Candidate locations may be considered as having merged if they are within a threshold of each other or a proposed location. Determining whether a candidate location has merged may therefore include determining a distance to a nearest proposed location and determining whether the distance is less than or equal to a threshold distance. The threshold distance may be a tolerance that may be defined based at least in part on object classification. For example, the merge tolerance/threshold distance may be smaller for a small object and larger for larger objects or objects that vary more greatly in size, such as buildings, fixed furniture (e.g., park bench, park table), electrical boxes, etc.

Operation 344 may additionally or alternatively include determining whether the number of candidate locations that have failed to merge (i.e., are at a distance from a nearest proposed location or other candidate location, in an example where proposed locations aren't used, that is greater than the threshold distance/merge tolerance) meets is less than a threshold number. If the number of candidate locations that have failed to merge exceeds the threshold number, example process 300 may return to operation 334 and/or, optionally, continue to operation 346. Example process 300 may continue to iterate between operations 334 and 344 (and optionally operation 346) until the number of candidate locations is less than or equal to the threshold number, the rate at which candidate locations are merging per iteration is below a threshold rate, or until a threshold number of iterations is reached.

At operation 346, example process 300 may include receiving a deletion of a proposed location, an additional landmark, or an instruction to fixate a portion of the pose graph. In some examples, a deletion or addition of a landmark may be received responsive to user instructions at a computing device. Additionally or alternatively, the deletion or addition of a landmark may be determined based at least in part on determining candidate locations that are not merging. In some examples, fixating a portion of the pose graph may include setting one or more pose nodes as being unalterable during the optimization. Fixating the portion may be based at least in part on determining that candidate locations associated therewith have merged.

If the number of candidate locations that have failed to merge is less than or equal to the threshold number, example process 300 may continue to operation 348. At operation 348, example process 300 may include determining, based at least in part on the adjusted pose (and/or the updated pose graph), map data associated with the environment, according to any of the techniques discussed herein. In some examples, determining the map data may include aligning sensor data based at least in part on the pose graph and generating a representation of the environment based at least in part on the aligned sensor data. For example, generating the representation, such as map 350, which depicts a portion of a representation that is part of the map data, may include determining a wire mesh, polygons, or the like to represent surfaces identified by the sensor data. In some examples, the sensor data used to determine the representation may include lidar data, radar data, and/or image data. In at least one example, the sensor data used may be the first sensor data type, which may include lidar data.

At operation 352, example process 300 may include transmitting the map data to a vehicle, according to any of the techniques discussed herein. In some examples, the map data may be transmitted to a fleet of vehicles. A vehicle may use the map data as part of SLAM operations to localize the vehicle within the environment, proceed cautiously in areas of the environment that include blind corners or other outlier conditions, etc.

Example System

Figure 4:
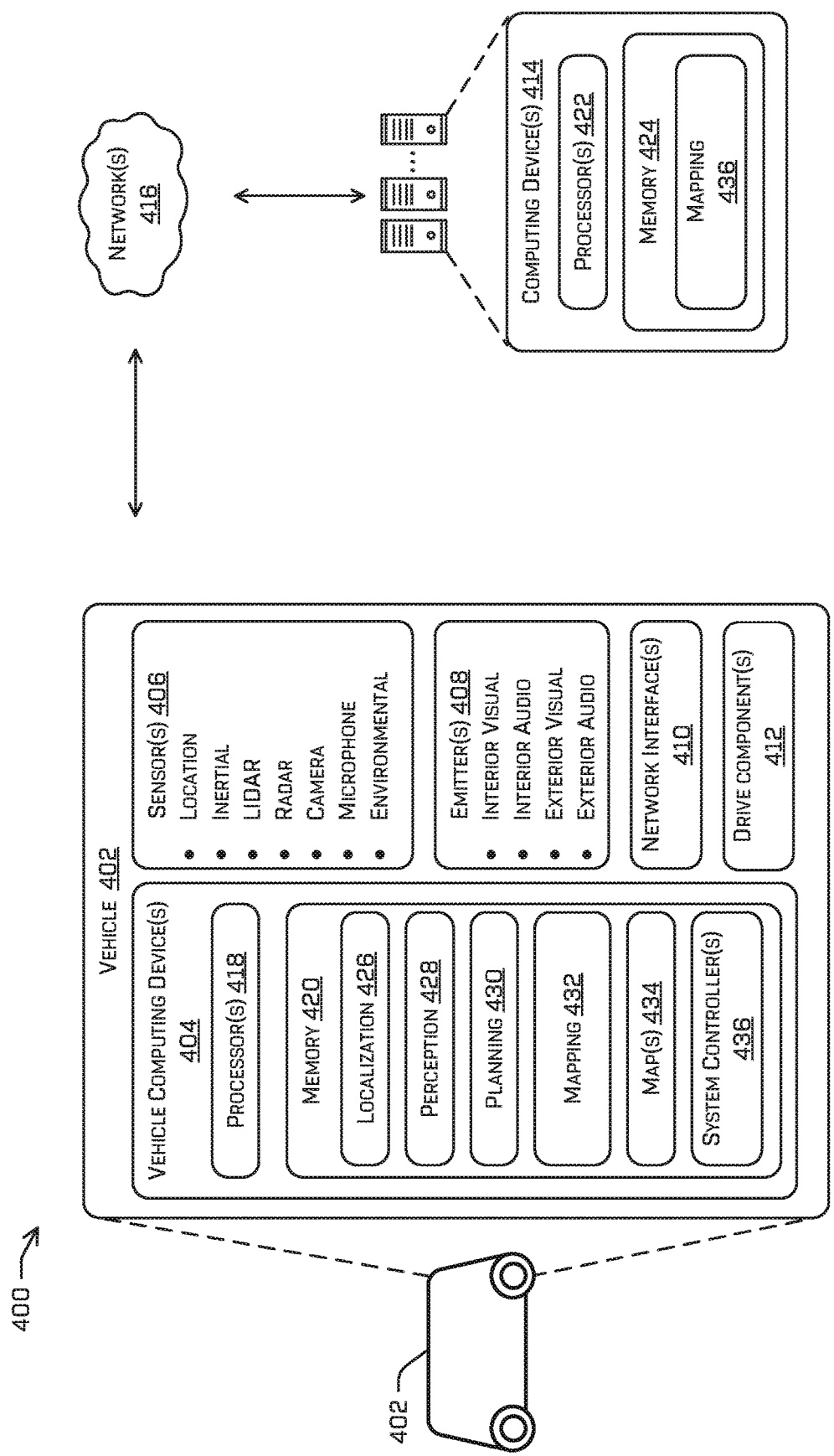
FIG. 4 illustrates a block diagram of an example system comprising a mapping component that may generate a pose graph and/or three-dimensional representation of an environment according to the techniques discussed herein.

FIG. 4 illustrates a block diagram of an example system 400 that implements the techniques discussed herein. In some instances, the example system 400 may include a vehicle 402, which may represent the vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include a vehicle computing device(s) 404, sensor(s) 406, emitter(s) 408, network interface(s) 410, and/or drive component(s) 412. Vehicle computing device(s) 404 may represent computing device(s) 106 and sensor(s) 406 may represent sensor(s) 104. The system 400 may additionally or alternatively comprise computing device(s) 414.

In some instances, the sensor(s) 406 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 414.

The vehicle 402 may also include emitter(s) 408 for emitting light and/or sound, as described above. The emitter(s) 408 in this example may include interior audio and visual emitter(s) to communicate with passengers of the vehicle 402. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive component(s) 412. Also, the network interface (s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 414. In some examples, computing device(s) 414 may comprise one or more nodes of a distributed computing system (e.g., a cloud computing architecture).

The network interface(s) 410 may include physical and/or logical interfaces for connecting the vehicle computing device(s) 404 to another computing device or a network, such as network(s) 416. For example, the network interface(s) 410 may enable Wi-Fi-based communication such as via frequencies defined by the IEEE 400.11 standards, short range wireless frequencies such as Bluetooth®, cellular communication (e.g., 2G, 6G, 4G, 4G LTE, 5G, etc.) or any suitable wired or wireless communications protocol that enables the respective computing device to interface with the other computing device(s). In some instances, the vehicle computing device(s) 404 and/or the sensor(s) 406 may send sensor data, via the network(s) 416, to the computing device(s) 414 at a particular frequency, after a lapse of a predetermined period of time, in near real-time, etc.

In some instances, the vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device(s) 404 may include processor(s) 418 and memory 420 communicatively coupled with the one or more processors 418. Memory 420 may represent memory 108. Computing device(s) 414 may also include processor(s) 422, and/or memory 424. The processor(s) 418 and/or 422 may be any suitable processor capable of executing instructions to process data and perform operations as described herein. By way of example and not limitation, the processor(s) 418 and/or 422 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 420 and/or 424 may be examples of non-transitory computer-readable media. The memory 420 and/or 424 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 420 and/or memory 424 may store a localization component 426, perception component 428, planning component 430, mapping component 432, map(s) 434, and/or system controller(s) 436. Perception component 428 may represent perception component 110, planning component 430 may represent planning component 112, and/or mapping component 432 may represent mapping component 114. Memory 424 may store mapping component 436.

In at least one example, the localization component 426 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 426 may include and/or request/receive map(s) 434 of an environment and can continuously determine a location, velocity, and/or orientation of the autonomous vehicle within the map(s) 434. In some instances, the localization component 426 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 426 may provide data to various components of the vehicle 402 to determine an initial position of an autonomous vehicle for generating a trajectory and/or for generating map data, as discussed herein. In some examples, localization component 426 may provide, to the mapping component 432, a location and/or orientation of the vehicle 402 relative to the environment and/or sensor data associated therewith. In some examples, the localization component 426 may generate a preliminary pose graph and may associate a pose node with a window of sensor data in log data stored at memory 420. This log data (including the preliminary pose graph) may be transmitted to computing device(s) 414 over network(s) 416.

In some instances, perception component 428 may comprise a primary perception system and/or a prediction system implemented in hardware and/or software. The perception component 428 may detect object(s) in in an environment surrounding the vehicle 402 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 428 is referred to as perception data.

The planning component 430 may receive a location and/or orientation of the vehicle 402 from the localization component 426 and/or perception data from the perception component 428 and may determine instructions for controlling operation of the vehicle 402 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 436 and/or drive component(s) 412 may parse/cause to be carried out, second instructions for the emitter(s) 408 may be formatted according to a second format associated therewith).

The mapping component 432 may operate in conjunction with localization component 426 to generate a preliminary pose graph and/or preliminary sensor data alignment for near-term planning and/or trajectory verification. In some examples, mapping component 432 may differ from mapping component 436 in that the mapping component 436 may conduct the soft-constraint optimization discussed herein. In an additional or alternate example, the soft-constraint optimization may also occur at mapping component 432. In some examples, a user may provide input at computing device(s) 414 via a user interface, such as to add or delete proposed locations or to fixate a portion of the pose graph. In some examples, the mapping component 436 may additionally or alternatively generate map data based at least in part on the refined pose graph and may transmit the map data to the vehicle 402, which may be stored in memory 420.

Although localization component 426, perception component 428, planning component 430, map(s) 434, and/or system controller(s) 436 are illustrated as being stored in memory 420, any of these components may include processor-executable instructions, machine-learned model(s) (e.g., a neural network), and/or hardware and all or part of any of these components may be stored on memory 424 or configured as part of computing device(s) 414.

As described herein, the localization component 426, the perception component 428, the planning component 430, mapping component 432 and/or 436, and/or other components of the system 400 may comprise one or more ML models. For example, the localization component 426, the perception component 428, and/or the planning component 430 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, and the like or visual transformers (ViTs), such as ConvNeXt.

Memory 420 may additionally or alternatively store one or more system controller(s) 436, which may be configured to control steering, propulsion, braking, safety, emitters, communication, and other systems of the vehicle 402. These system controller(s) 436 may communicate with and/or control corresponding systems of the drive component(s) 412 and/or other components of the vehicle 402. For example, the planning component 430 may generate instructions based at least in part on perception data generated by the perception component 428, which the trajectory verification component 432 may validate and/or transmit to the system controller(s) 436. The system controller(s) 436 may control operation of the vehicle 402 based at least in part on the instructions received from the planning component 430. In some examples, these instructions may be based at least in part on map data generated according to the techniques discussed herein. In some examples, the trajectory verification component 432 may replace instructions generated by the planning component 430 with alternate instructions associated with a contingent trajectory such as, for example, a contingent trajectory that may specify an alternate maneuver, and/or the like.

It should be noted that while FIG. 4 is illustrated as a distributed system, in alternative examples, components of the vehicle 402 may be associated with the computing device(s) 414 and/or components of the computing device(s) 414 may be associated with the vehicle 402. That is, the vehicle 402 may perform one or more of the functions associated with the computing device(s) 414, and vice versa.

EXAMPLE CLAUSES

A. A method comprising: receiving a pose graph determined based at least in part on lidar data, the pose graph indicating a series of one or more of positions or orientations as a series of pose estimates associated with a vehicle in an environment; receiving a first object detection associated with first image data and a first pose of the series; receiving a second object detection associated with second image data and a second pose of the series; determining, based at least in part on the first object detection, a first candidate location associated with the first object detection; determining, based at least in part on the second object detection, a second candidate location associated with the second object detection; determining, based at least in part on the first candidate location and the second candidate location being within a threshold distance and being associated with a same object classification, to associate the first object detection and the second object detection with a proposed location; altering, as a first adjusted pose, at least one of the first pose, the first candidate location, the second candidate location, or the proposed location to reduce a distance between the first candidate location and the proposed location while disregarding the second object detection; determining, based at least in part on the first adjusted pose, to disassociate the second candidate location from the first candidate location and the proposed location; altering, as a second adjusted pose, at least one of the first pose, the first candidate location, the second candidate location, or the proposed location to reduce a distance between the first candidate location or the second candidate location and the proposed location; determining, based at least in part on the second adjusted pose, map data associated with the environment; and transmitting the map data to the vehicle configured to traverse the environment based at least in part on the map data.

B. The method of paragraph A, wherein determining the proposed location is based at least in part on: a first position and first orientation of a sensor associated with the vehicle and the first pose of the vehicle, and determining, as a proposed location, an average position based at least in part on the first candidate location and the second candidate location.

C. The method of either paragraph A or B, wherein determining to disassociate the second candidate location from the first candidate location and the proposed location is further based at least in part on a loss function used as part of the altering.

D. The method of any one of paragraphs A-C, wherein the altering comprises determining, by a loss function and based at least in part an object classification associated with the first candidate location.

E. The method of any one of paragraphs A-D, wherein determining the map data comprises: determining, based at least in part on the adjusted pose, an updated pose graph; and aligning sensor data based at least in part on the updated pose graph.

F. A system comprising: one or more processors; and a memory storing processor-executable instructions that, when executed by the one or more processors, cause the system to perform operations comprising: receiving a pose graph determined based at least in part on first sensor data, the pose graph indicating a series of one or more of positions or orientations as a series of pose estimates associated with a vehicle in an environment; receiving a first candidate location associated with a second sensor data type and a first pose of the series; receiving a second candidate location associated with the second sensor data type and a second pose of the series; determining, based at least in part on the first candidate location and the second candidate location, a proposed location based at least in part on determining that the first candidate location and the second candidate location are within a first threshold distance and that a first object detection associated with the first candidate location and a second object detection associated with the second candidate location are associated with a same object classification; altering, as an adjusted pose, at least one of the first pose, the second pose, or the proposed location to reduce a distance between the first candidate location, the second candidate location, and the proposed location, determining to disassociate the second candidate location from the first candidate location and the proposed location based at least in part on determining that the second candidate location is failing to merge to at least one of the first candidate location or the proposed location; determining, based at least in part on the adjusted pose, map data associated with the environment; and transmitting the map data to the vehicle configured to traverse the environment based at least in part on the map data.

G. The system of paragraph F, wherein determining to disassociate the second candidate location from the first candidate location and the proposed location is based at least in part on determining that the second candidate location is failing to merge to at least one of the first candidate location or the proposed location after one or more iterations of the altering.

H. The system of either paragraph F or G, wherein determining the proposed location is based at least in part on: a first position and first orientation of a sensor associated with the vehicle and the first pose of the vehicle, and determining, as a proposed location, an average position based at least in part on the first candidate location and the second candidate location.

I. The system of any one of paragraphs F-H, wherein: the first candidate location is associated with a first confidence score; the second candidate location is associated with a second confidence score; and the operations further comprise determining, as a proposed location, a weighted average based at least in part on the first confidence score and the second confidence score.

J. The system of any one of paragraphs F-I, wherein: the proposed location is a first proposed location; the operations further comprise determining a second proposed location based at least in part on one or more additional candidate locations; and the altering results in the second candidate location merging with the second proposed location.

K. The system of any one of paragraphs F-J, wherein determining to disassociate the second candidate location from the first candidate location and the proposed location is further based at least in part on a loss function used as part of the altering.

L. The system of any one of paragraphs F-K, wherein the altering comprises determining, by a loss function and based at least in part on an object classification associated with the first candidate location, that a weight is less than or equal to a threshold weight.

M. The system of any one of paragraphs F-L, wherein determining the map data comprises: determining, based at least in part on the adjusted pose, an updated pose graph; and aligning sensor data based at least in part on the updated pose graph.

N. The system of any one of paragraphs F-M, wherein altering the first pose results in altering the first candidate location and altering the second pose results in altering the second candidate location.

O. A non-transitory computer-readable medium storing processor-executable instructions that, when executed by one or more processors, cause the one or more processors to perform operations comprising: receiving a pose graph determined based at least in part on first sensor data, the pose graph indicating a series of one or more of positions or orientations as a series of pose estimates associated with a vehicle in an environment; receiving a first candidate location associated with a second sensor data type and a first pose of the series; receiving a second candidate location associated with the second sensor data type and a second pose of the series; determining, based at least in part on the first candidate location and the second candidate location, a proposed location; altering, as an adjusted pose, at least one of the first pose, the second pose, or the proposed location to reduce a distance between the first candidate location, the second candidate location, and the proposed location, determining to disassociate the second candidate location from the first candidate location and the proposed location based at least in part on determining that the second candidate location is failing to merge to at least one of the first candidate location or the proposed location; and determining, based at least in part on the adjusted pose, map data associated with the environment.

P. The non-transitory computer-readable medium of paragraph O, wherein determining to disassociate the second candidate location from the first candidate location and the proposed location is based at least in part on determining that the second candidate location is failing to merge to at least one of the first candidate location or the proposed location after one or more iterations of the altering.

Q. The non-transitory computer-readable medium of either paragraph O or P, wherein determining the proposed location is based at least in part on: a first position and first orientation of a sensor associated with the vehicle and the first pose of the vehicle, and determining, as a proposed location, an average position based at least in part on the first candidate location and the second candidate location.

R. The non-transitory computer-readable medium of any one of paragraphs O-Q, wherein: the first candidate location is associated with a first confidence score; the second candidate location is associated with a second confidence score; and the operations further comprise determining, as a proposed location, a weighted average based at least in part on the first confidence score and the second confidence score.

S. The non-transitory computer-readable medium of any one of paragraphs O-R, wherein: the proposed location is a first proposed location; the operations further comprise determining a second proposed location based at least in part on one or more additional candidate locations; and the altering results in the second candidate location merging with the second proposed location.

T. The non-transitory computer-readable medium of any one of paragraphs O-S, wherein: determining to disassociate the second candidate location from the first candidate location and the proposed location is further based at least in part on a loss function used as part of the altering; and determining the proposed location is based at least in part on determining that the first candidate location and the second candidate location are within a first threshold distance and that a first object detection associated with the first candidate location and a second object detection associated with the second candidate location are associated with a same object classification.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
receiving a pose graph determined based at least in part on lidar data, the pose graph indicating a series of one or more of positions or orientations as a series of pose estimates associated with a vehicle in an environment;
receiving a first object detection associated with first image data and a first pose of the series;
receiving a second object detection associated with second image data and a second pose of the series;
determining, based at least in part on the first object detection, a first candidate location associated with the first object detection;
determining, based at least in part on the second object detection, a second candidate location associated with the second object detection;
determining, based at least in part on the first candidate location and the second candidate location being within a threshold distance and being associated with a same object classification, to associate the first object detection and the second object detection with a proposed location;
altering, as a first adjusted pose, at least one of the first pose, the first candidate location, the second candidate location, or the proposed location to reduce a distance between the first candidate location and the proposed location while disregarding the second object detection;

determining, based at least in part on the first adjusted pose, to disassociate the second candidate location from the first candidate location and the proposed location;

altering, as a second adjusted pose, at least one of the first pose, the first candidate location, the second candidate location, or the proposed location to reduce a distance between the first candidate location or the second candidate location and the proposed location;

determining, based at least in part on the second adjusted pose, map data associated with the environment; and transmitting the map data to the vehicle configured to traverse the environment based at least in part on the map data.

2. The method of claim 1, wherein determining the proposed location is based at least in part on:
a first position and first orientation of a sensor associated with the vehicle and the first pose of the vehicle, and
determining, as a proposed location, an average position based at least in part on the first candidate location and the second candidate location.

3. The method of claim 1, wherein determining to disassociate the second candidate location from the first candidate location and the proposed location is further based at least in part on a loss function used as part of the altering.

4. The method of claim 1, wherein the altering comprises determining, by a loss function and based at least in part an object classification associated with the first candidate location.

5. The method of claim 1, wherein determining the map data comprises:
determining, based at least in part on the adjusted pose, an updated pose graph; and
aligning sensor data based at least in part on the updated pose graph.

6. A system comprising:
one or more processors; and
a memory storing processor-executable instructions that, when executed by the one or more processors, cause the system to perform operations comprising:
receiving a pose graph determined based at least in part on first sensor data, the pose graph indicating a series of one or more of positions or orientations as a series of pose estimates associated with a vehicle in an environment;
receiving a first candidate location associated with a second sensor data type and a first pose of the series;
receiving a second candidate location associated with the second sensor data type and a second pose of the series;
determining, based at least in part on the first candidate location and the second candidate location, a proposed location based at least in part on determining that the first candidate location and the second candidate location are within a first threshold distance and that a first object detection associated with the first candidate location and a second object detection associated with the second candidate location are associated with a same object classification;
altering, as an adjusted pose, at least one of the first pose, the second pose, or the proposed location to reduce a distance between the first candidate location, the second candidate location, and the proposed location,
determining to disassociate the second candidate location from the first candidate location and the proposed location based at least in part on determining that the second candidate location is failing to merge to at least one of the first candidate location or the proposed location;
determining, based at least in part on the adjusted pose, map data associated with the environment; and
transmitting the map data to the vehicle configured to traverse the environment based at least in part on the map data.

7. The system of claim 6, wherein determining to disassociate the second candidate location from the first candidate location and the proposed location is based at least in part on determining that the second candidate location is failing to merge to at least one of the first candidate location or the proposed location after one or more iterations of the altering.

8. The system of claim 6, wherein determining the proposed location is based at least in part on:
a first position and first orientation of a sensor associated with the vehicle and the first pose of the vehicle, and
determining, as a proposed location, an average position based at least in part on the first candidate location and the second candidate location.

9. The system of claim 6, wherein:
the first candidate location is associated with a first confidence score;
the second candidate location is associated with a second confidence score; and
the operations further comprise determining, as a proposed location, a weighted average based at least in part on the first confidence score and the second confidence score.

10. The system of claim 6, wherein:
the proposed location is a first proposed location;
the operations further comprise determining a second proposed location based at least in part on one or more additional candidate locations; and
the altering results in the second candidate location merging with the second proposed location.

11. The system of claim 6, wherein determining to disassociate the second candidate location from the first candidate location and the proposed location is further based at least in part on a loss function used as part of the altering.

12. The system of claim 6, wherein the altering comprises determining, by a loss function and based at least in part on an object classification associated with the first candidate location, that a weight is less than or equal to a threshold weight.

13. The system of claim 6, wherein determining the map data comprises:
determining, based at least in part on the adjusted pose, an updated pose graph; and
aligning sensor data based at least in part on the updated pose graph.

14. The system of claim 6, wherein altering the first pose results in altering the first candidate location and altering the second pose results in altering the second candidate location.

15. A non-transitory computer-readable medium storing processor-executable instructions that, when executed by one or more processors, cause the one or more processors to perform operations comprising:
receiving a pose graph determined based at least in part on first sensor data, the pose graph indicating a series of one or more of positions or orientations as a series of pose estimates associated with a vehicle in an environment;
receiving a first candidate location associated with a second sensor data type and a first pose of the series;

receiving a second candidate location associated with the second sensor data type and a second pose of the series;

determining, based at least in part on the first candidate location and the second candidate location, a proposed location;

altering, as an adjusted pose, at least one of the first pose, the second pose, or the proposed location to reduce a distance between the first candidate location, the second candidate location, and the proposed location, determining to disassociate the second candidate location from the first candidate location and the proposed location based at least in part on determining that the second candidate location is failing to merge to at least one of the first candidate location or the proposed location; and determining, based at least in part on the adjusted pose, map data associated with the environment.

16. The non-transitory computer-readable medium of claim 15, wherein determining to disassociate the second candidate location from the first candidate location and the proposed location is based at least in part on determining that the second candidate location is failing to merge to at least one of the first candidate location or the proposed location after one or more iterations of the altering.

17. The non-transitory computer-readable medium of claim 15, wherein determining the proposed location is based at least in part on:
a first position and first orientation of a sensor associated with the vehicle and the first pose of the vehicle, and
determining, as a proposed location, an average position based at least in part on the first candidate location and the second candidate location.

18. The non-transitory computer-readable medium of claim 15, wherein:
the first candidate location is associated with a first confidence score;
the second candidate location is associated with a second confidence score; and
the operations further comprise determining, as a proposed location, a weighted average based at least in part on the first confidence score and the second confidence score.

19. The non-transitory computer-readable medium of claim 15, wherein:
the proposed location is a first proposed location;
the operations further comprise determining a second proposed location based at least in part on one or more additional candidate locations; and
the altering results in the second candidate location merging with the second proposed location.

20. The non-transitory computer-readable medium of claim 15, wherein:
determining to disassociate the second candidate location from the first candidate location and the proposed location is further based at least in part on a loss function used as part of the altering; and
determining the proposed location is based at least in part on determining that the first candidate location and the second candidate location are within a first threshold distance and that a first object detection associated with the first candidate location and a second object detection associated with the second candidate location are associated with a same object classification.

* * * * *